Figure 1:
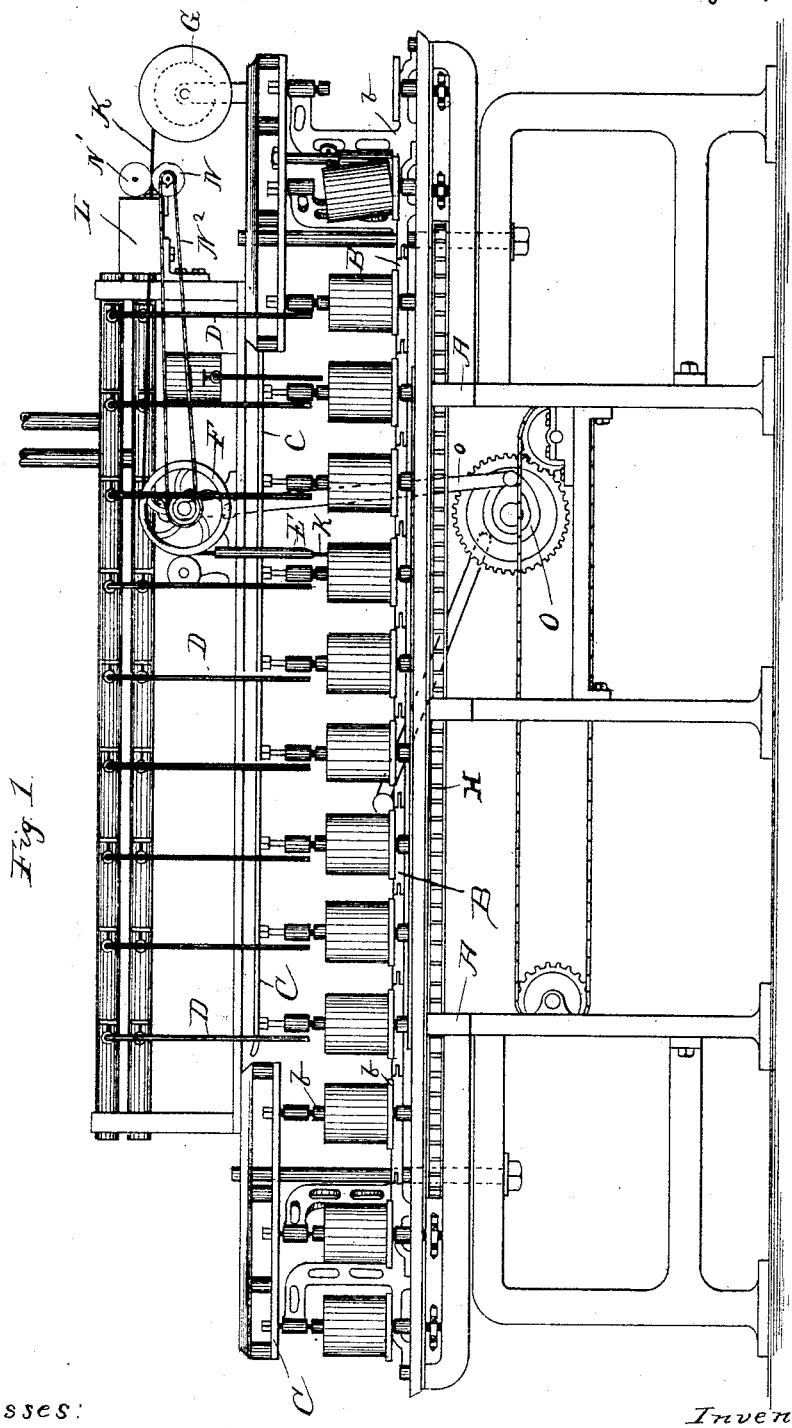

(No Model.) 2 Sheets—Sheet 1.

E. NORTON & J. G. HODGSON.
SOLDERING MACHINE.

No. 345,254. Patented July 6, 1886.

Witnesses:
Lew. E. Curtis
H. W. Munday

Inventors:
Edwin Norton
John G. Hodgson
By Munday, Evarts & Adcock
their Attorneys (No Model.) 2 Sheets—Sheet 2.
E. NORTON & J. G. HODGSON.
SOLDERING MACHINE.
No. 345,254. Patented July 6, 1886.
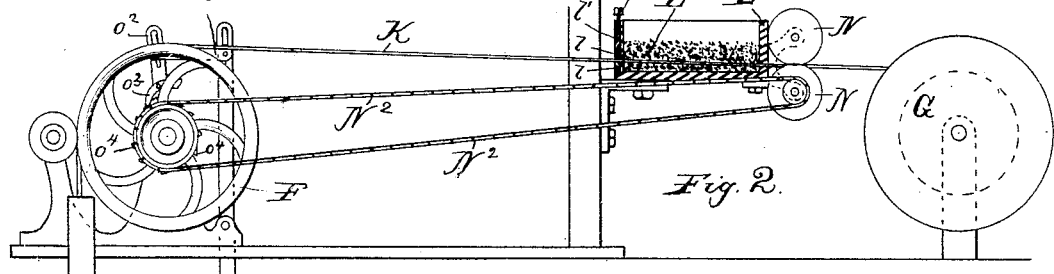
Fig. 2.
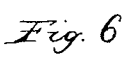
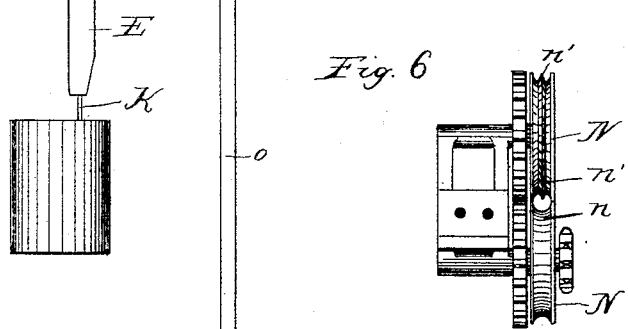
Fig. 6.
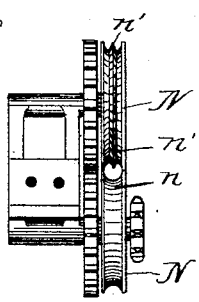
Fig. 3.
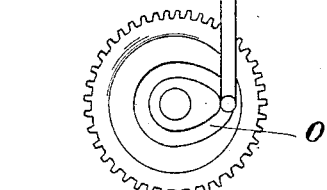
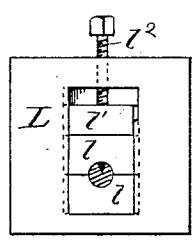
Fig. 4. Fig. 5.
Witnesses:
Lew E. Curtis.
H. W. Munday.
Inventors:
Edwin Norton
John G. Hodgson
By Munday, Evarts & Adcock
Their Attorneys.

United States Patent Office.

EDWIN NORTON AND JOHN G. HODGSON, OF CHICAGO, ILL., ASSIGNORS TO SAID EDWIN NORTON AND OLIVER W. NORTON, OF SAME PLACE.

SOLDERING-MACHINE.

SPECIFICATION forming part of Letters Patent No. 345,254, dated July 6, 1886.

Application filed April 5, 1886. Serial No. 197,780. (No model.)

*To all whom it may concern:*

Be it known that we, EDWIN NORTON and JOHN G. HODGSON, citizens of the United States, residing in Chicago, in the county of Cook and State of Illinois, have invented a new and useful Improvement in Soldering-Machines, of which the following is a specification.

Our invention relates to that class of soldering-machines wherein wire-solder is employed, the same being fed either directly against the joint to be soldered or cut into short pieces which are applied to the joint.

Heretofore in such machines the application of rosin or other powdered flux has been a matter of difficulty, and these machines have therefore ordinarily been made to apply acid fluxes. This in some cases is thought to be objectionable, especially in soldering on the caps or final heads of filled cans, owing to the liability of the acid to come in contact with the contents of the can. In putting up condensed milk, for example, a touch of acid might injure the contents of a whole can.

The object of our invention is to simplify the construction of such machines and increase their efficiency or rapidity of operation, and at the same time provide a practical means of automatically applying a rosin or other similar flux.

To this end our invention consists, in a soldering-machine wherein wire-solder is employed, of the combination of the wire-solder-feeding device with means for applying flux to the solder wire in its path to the joint to be soldered.

The machine is furnished with a box or vessel containing rosin or other flux in a solid or liquid form, and the wire or its surface is roughened, recessed, grooved, or otherwise prepared, so that as it is drawn through the flux-vessel it will take up the required amount of flux; or the flux employed may itself be made of such a character that it will adhere to the plain wire in sufficient quantities without giving the wire any previous preparation. A flux, for example, composed partly of rosin and partly of stearine or paraffine in about equal proportions will adhere to the plain solder-wire in sufficient quantities, especially if the flux is kept melted while the wire is being passed through it. The preferable way, however, is to provide the wire-solder with a continuous groove or channel and pass it through a box or mass of powdered rosin, and thus fill the groove or channel even with the surface of the wire. The groove or channel may be formed in the wire as it is fed forward through the machine by any suitable means—as, for example, a grooving knife or die in the front end of the flux box or vessel, or by a pair of revolving rollers or dies located in front end of the flux-vessel. The groove or channel in the wire, however, is preferably formed at the time the wire is manufactured, especially if the wire-solder is made by forcing set solder out of a hydraulic press through a die, as is commonly done. In such case the channel or groove in the wire may be made by simply using a die of the required form.

In the accompanying drawings, which form a part of this specification, and in which similar letters of reference indicate like parts, we have shown, for convenience, our invention as applied to a can-cap-soldering machine. It will be understood, however, that it is equally applicable to other soldering-machines wherein wire-solder is used.

In said drawings, Figure 1 is a side elevation of a machine embodying our invention. Fig. 2 is an enlarged detail view of the soldering and fluxing device. Fig. 3 is a detail view of the wiper for removing the surplus flux from the wire as it passes through the fluxing-box. Figs. 4 and 5 are cross-sections of the solder wire, the former taken at a point before the wire passes through the fluxing-box and the latter after. Fig. 6 is a detail view of the wire-grooving rollers.

In said drawings, A represents the frame of the machine; B, an intermittently-moving carrier, preferably a link-chain, provided with revolving can-holders or chucks *b* at intervals; B', the track or way upon which said carrier travels; C, a cam or track for depressing and raising the upper disk of the revolving can-holders to clasp and release the heads or caps of the cans. D D represent heaters, preferably gas jets or burners, located on the frame of the machine in the path of said carrier at intervals equal to the intervals between the can-holders on said carrier, so that a number of cans or the seams thereof may be heated or partially heated at once. E represents a wire-solder-feed guide or tube, F the wire-solder-feed wheel, G the spool or reel upon which the wire-solder is wound, and H is the chain for revolving the can holders or chucks. The particular construction of these parts of this soldering-machine is fully shown and described in our previous application, No. 173,212, filed August 1, 1885, and as the same is not herein a subject of claim, and do not constitute part of the present improvement, we do not deem it necessary to enter into a detailed description of the same, but would refer therefor to said previous application and to the patent thereon to be granted. Our present improvement is equally applicable to other soldering-machines, and we show it in connection with this particular kind of machine for sake of convenience.

K represents the wire-solder, having a groove or channel, $k$, extending throughout its length.

L is a box or vessel containing flux L', preferably rosin in a powdered state. This flux-vessel L is preferably located between the wire-solder spool or rim and its feed-wheel. It may, however, be located at other points—as, for example, between the feed-wheel and the wire-solder-feed guide or tube. The rear end or side of this flux-vessel is furnished with a hole or opening provided with a wiper, $l$, preferably consisting of one or more rubber blocks having holes or grooves through the same for the wire. A follower, $l'$, and set-screw $l^2$ may serve to tighten the wiper upon the wire when necessary. This wiper will serve to remove any surplus flux from the surface of the wire, and also tend to press the powdered flux into the groove or channel.

The groove or channel in the wire-solder is preferably formed at the time the same is manufactured; but this groove may, if desired, be formed in the machine as the wire is fed through by the feed-wheel by means of a pair of roller-dies, N N', having half-grooves $n$ for the wire, and a circular die blade or projection, $n'$, on one of said rollers to form the groove therein. These roller-dies should be located in front of the flux-vessel, and they, or one of them, should be driven positively, and preferably by a chain or band, $N^2$, from the shaft of the feed-wheel F. The feed-wheel may be revolved intermittently in any suitable manner to advance or feed the solder wire forward the required length to flux and solder each can or seam as it is presented by the intermittently-moving carrier.

The means indicated in the drawings for driving the feed-wheel is the same as that shown and described in our said previous application, and consists, briefly, in a cam, O, on one of the main shafts of the machine, operating a vibrating lever, $o$, connected at its upper end by a link, $o'$, with a crank arm or lever, $o^2$, pivoted on the shaft of the feed-wheel and carrying a pawl, $o^3$, which engages a ratchet, $o^4$, on the feed-wheel or its shaft.

By the heaters or burners D the joint is heated by the time it reaches the point where the solder-tube is located, and then as the can is revolved by the chuck or holder $b$ the feed-wheel projects the solder wire charged with flux against the heated joint, thus melting both the solder and the flux.

If the flux employed is melted or kept in a liquid condition in the vessel L, the wire-solder will of course enter and leave the flux-vessel over its top, and be depressed below the level of the liquid as it passes through the same by suitable guides or rollers in the vessel, or else the holes or openings in the ends of the flux-vessel through which the solder wire passes into and from the same should be packed or otherwise made sufficiently tight around the solder wire to prevent the liquid flux from running out or escaping. If a liquid flux—such as melted paraffine or rosin—is employed, it will cool and become solid after issuing from the vessel L before it reaches the feed-wheel.

In using liquid flux it is preferable that the groove or channel in the wire-solder should be located on the upper part of the wire as it passes through the liquid flux, especially if the flux employed should be of such a character that it will not adhere to a plain or round wire in sufficient quantities.

By our invention a great saving results in the amount of flux required, as just the proper amount may be supplied and with absolute uniformity, so that there need be no wastage, as heretofore has been the case where the flux has been applied both by hand and by machinery. It should also be observed that instead of passing the solder wire through the body of the liquid or solid flux in the flux-vessel, the flux may be provided with devices for pouring or sprinkling or otherwise applying the flux to the wire as the wire passes through the machine.

We claim—

1. The combination, in a soldering-machine, of a wire-solder-feed guide, means for feeding the wire-solder forward, and a flux-containing vessel in the path of the wire-solder, whereby the flux is conveyed to the joint with and by the solder wire, substantially as specified.

2. The combination, with a wire-solder-feed guide, of a feed-wheel, a wire-solder spool or reel, and a flux box or vessel between said reel and feed-wheel in the path of the wire-solder, substantially as specified.

3. In a soldering-machine wherein wire-solder is employed and fed to the joint, a flux-containing vessel in the path of the wire-solder, substantially as specified.

4. The combination, with a wire-solder-feed device, of a flux-containing vessel in the path of the wire-solder, and a device for grooving or channeling the wire-solder before it passes through said flux-vessel, substantially as specified.

5. The combination, in a soldering-machine, of a wire-solder-feed guide, and a flux-containing vessel in the path of the wire-solder, whereby the flux is conveyed to the joint with and by the solder wire, and a wiper for removing the surplus flux from the solder wire, substantially as specified.

6. The combination, with a wire-solder-feed guide, of a feed-wheel, a wire-solder spool or reel, and a flux box or vessel between said reel and feed-wheel in the path of the wire-solder, said flux box or vessel being provided with a wiper, substantially as specified.

7. The combination, with a wire-solder-feed device, of a flux-containing vessel in the path of the wire-solder, and a pair of revolving rollers or dies for preparing the surface of the wire to take up the flux, substantially as specified.

8. The combination, with an intermittently-moving carrier, of a series of revolving can-holders at intervals on said carrier, a heater in the path of said carrier, a wire-solder-feed guide, and a flux-containing vessel in the path of the wire-solder, substantially as specified.

9. The combination, with an intermittently-moving carrier, of a series of revolving can-holders at intervals on said carrier, a series of heaters at intervals in the path of said carrier, a wire-solder-feed guide, and a flux-containing vessel in the path of the wire-solder, substantially as specified.

10. The combination, with an intermittently-moving carrier, of a series of revolving can-holders at intervals on said carrier, a series of heaters at intervals in the path of said carrier, a wire-solder-feed guide, a flux-containing vessel in the path of the wire-solder, and a wire-solder-feed wheel, substantially as specified.

11. The combination, with an intermittently-moving carrier, of a series of revolving can-holders at intervals on said carrier, a series of heaters at intervals in the path of said carrier, a wire-solder-feed guide, a flux-containing vessel in the path of the wire-solder, a wire-solder-feed wheel, and dies or rollers for grooving or channeling the wire-solder.

12. The combination, in a soldering-machine, of a wire-solder-feeding device and means for applying flux to the solder wire, substantially as specified.

EDMUND NORTON.
JOHN G. HODGSON.

Witnesses:
H. M. MUNDAY,
EDMUND ADCOCK.